(12) United States Patent
Cheng

(10) Patent No.: US 8,083,841 B2
(45) Date of Patent: Dec. 27, 2011

(54) AIR FILTER WITH A CLOG-DETECTING DEVICE

(75) Inventor: Yuan-Tai Cheng, Taichung (TW)

(73) Assignee: San Ford Machinery Co., Ltd., Taichung (TW)

( * ) Notice: Subject to any disclaimer, the term of this patent is extended or adjusted under 35 U.S.C. 154(b) by 549 days.

(21) Appl. No.: 12/196,770

(22) Filed: Aug. 22, 2008

(65) Prior Publication Data

US 2010/0043643 A1  Feb. 25, 2010

(51) Int. Cl.
 *B01D 49/00* (2006.01)
(52) U.S. Cl. ............ 96/417; 96/418; 96/421; 96/422; 55/467; 55/471; 55/486; 55/DIG. 34
(58) Field of Classification Search .......... 96/417, 96/418, 421, 422; 55/467, 471, 486, DIG. 34; 116/271, DIG. 25; 73/1.01–1.06, 1.41, 1.45, 73/23.2, 23.33, 24.03
See application file for complete search history.

(56) References Cited

U.S. PATENT DOCUMENTS

| 6,723,159 | B2 * | 4/2004 | Cheng ........................ 96/421 |
| 2007/0001634 | A1 * | 1/2007 | Wei et al. ..................... 318/254 |

* cited by examiner

*Primary Examiner* — Jason M Greene
*Assistant Examiner* — Karla Hawkins
(74) *Attorney, Agent, or Firm* — Ming Chow; Sinorica, LLC

(57) ABSTRACT

An air filter with a clog-detecting device includes a housing having a wind outlet and a wind intake, a filter unit positioned between the wind outlet and the wind intake, an exhauster disposed between the wind outlet and the filter unit, a magnetic induction unit positioned on the exhauster, and a warning unit assembled on the housing and electrically connected with the magnetic induction unit. A metallic plate is axially fixed on the rotating spindle of a motor and positioned adjacent to the magnetic induction unit, having its upper side formed with at least one projection to enable the magnetic induction unit to induce the metallic plate and produce pulse signals. Thus, by detecting the frequency of the pulse signal, a user can know whether the air filter is clogged or not and proceed to remove the clogged condition to let the air filter continue to work normally.

6 Claims, 5 Drawing Sheets

AIR FILTER WITH A CLOG-DETECTING DEVICE

BACKGROUND OF THE INVENTION

1. Field of the Invention

This invention relates to an air filter with a clog-detecting device.

2. Description of the Prior Art

A conventional air filter having function of indicating clogged conditions, as shown in FIGS. 1 and 2, which is disclosed in a R.O.C. patent NO. 520767 and a U.S. Pat. No. 6,723,159, includes an indicating device 22 assembled between the wind outlet 11 of a housing 1 and the exhaust orifice 21 of a windmill. The indicating device 22 is provided with a basic frame 221 pivotally connected with a pivot 222 having its outer end pivotally inserted out of the housing 1 and combined with an indicting needle 223, which can be turned together with the pivot 222 to move between a first location 12 and a second location 13 on the surface of the housing 1.The pivot 222 is secured with a wind-blocking sheet 224. Thus, when the filter unit of the air filter is in a normal condition without being clogged, air current exhausted from the exhaust orifice 21 to the wind outlet 11 is sufficient to drive the wind-blocking sheet 224 to turn and actuate the indicating needle 223 to move from the first location 12 to the second location 13. If the indicating needle 223 cannot be moved to the second location 13, it is indicated that the filter unit is clogged and has to be washed clean or replaced.

However, the convention air filter has the following drawbacks.

1. The indicating needle 223 is exposed to the outer surface of the housing 1 so it is likely to be bumped by external force to influence its accuracy.

2. Dust and impurities are easy to adhere to the joint location of the indicating needle 223 and the housing 1.

3. In the course of being transported, the housing 1 is liable to produce swinging and collision, causing friction and disengagement to the jointed portion of the indicating needle 223 and the pivot 222.

4. The conventional air filter is mostly installed at a high ceiling so it is hard to see and judge the accurate position indicated by the indicating needle 223.

SUMMARY OF THE INVENTION

The objective of this invention is to offer an air filter with a clog-detecting device, including a housing having a wind outlet and a wind intake, a filter unit positioned between the wind outlet and the wind intake of the housing, an exhauster installed between the wind outlet and the filter unit, a magnetic induction unit assembled on the exhauster, and a warning unit disposed on the housing and electrically connected with the magnetic induction unit. A metallic plate is axially fixed on the rotating spindle of the motor of the exhauster and located adjacent to the magnetic induction unit, having its upper side formed with at least one projection so that the magnetic induction unit can induce the magnetic plate and produce pulse signals. Thus, by detecting the frequency of the pulse signals, a user is able to know whether or not the air filter is in a clogged condition and proceed to remove the clogged condition to let the air filter continue to work normally.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
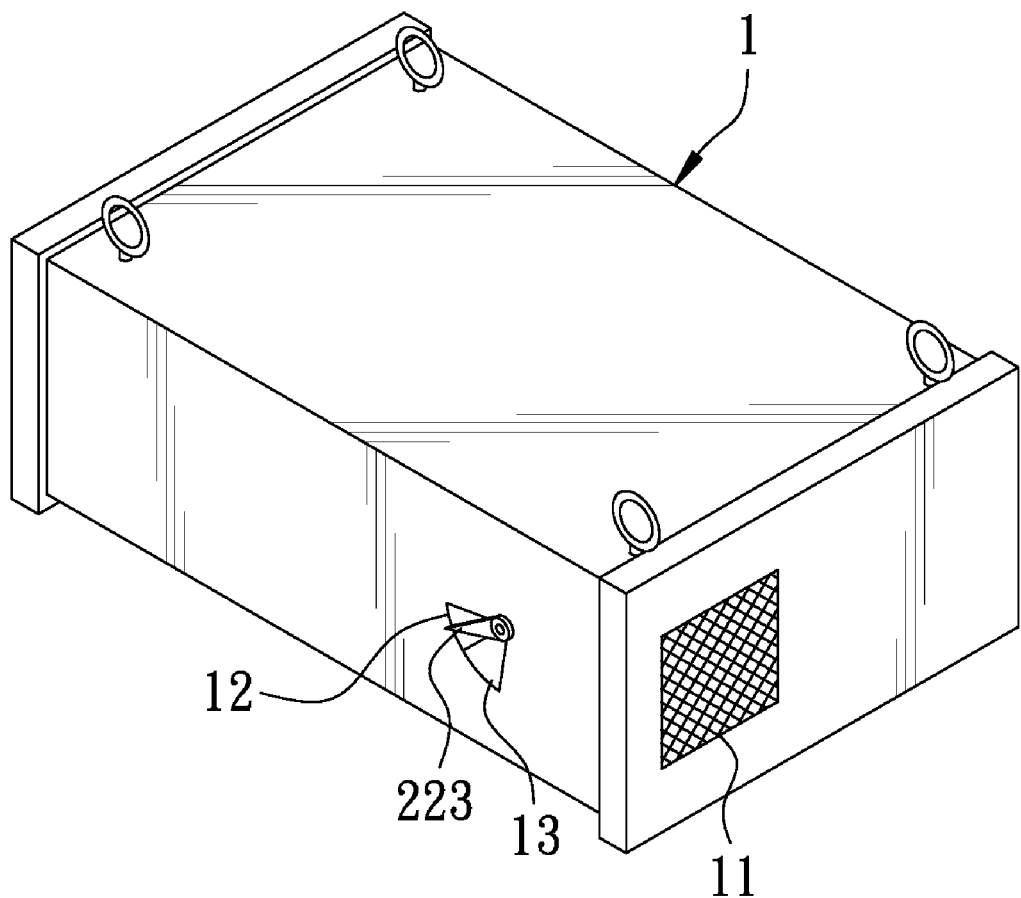
FIG. 1 is a perspective view of a conventional air filter.
Figure 2:
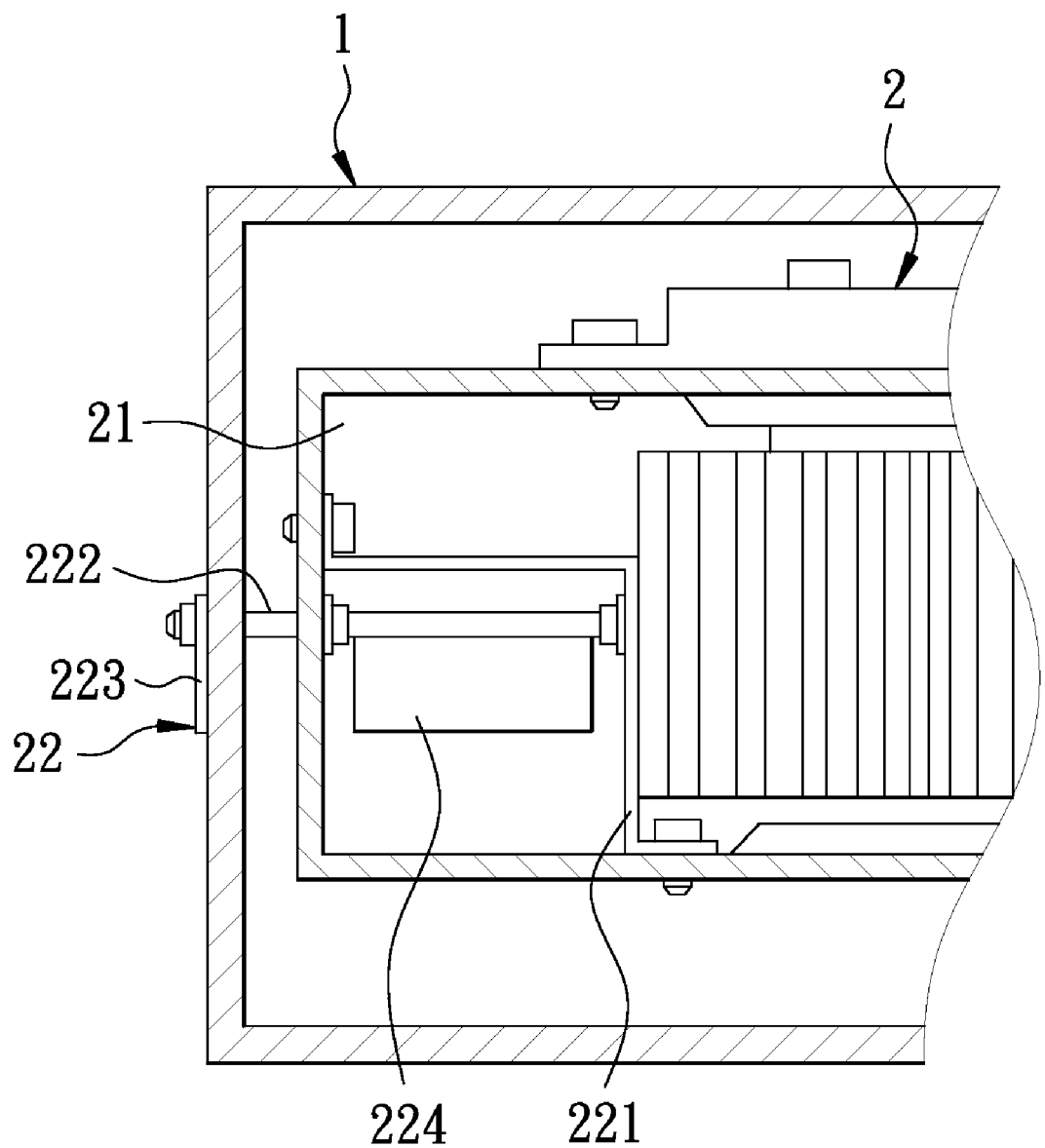
FIG. 2 is a cross-sectional view of the conventional air filter.
Figure 3:
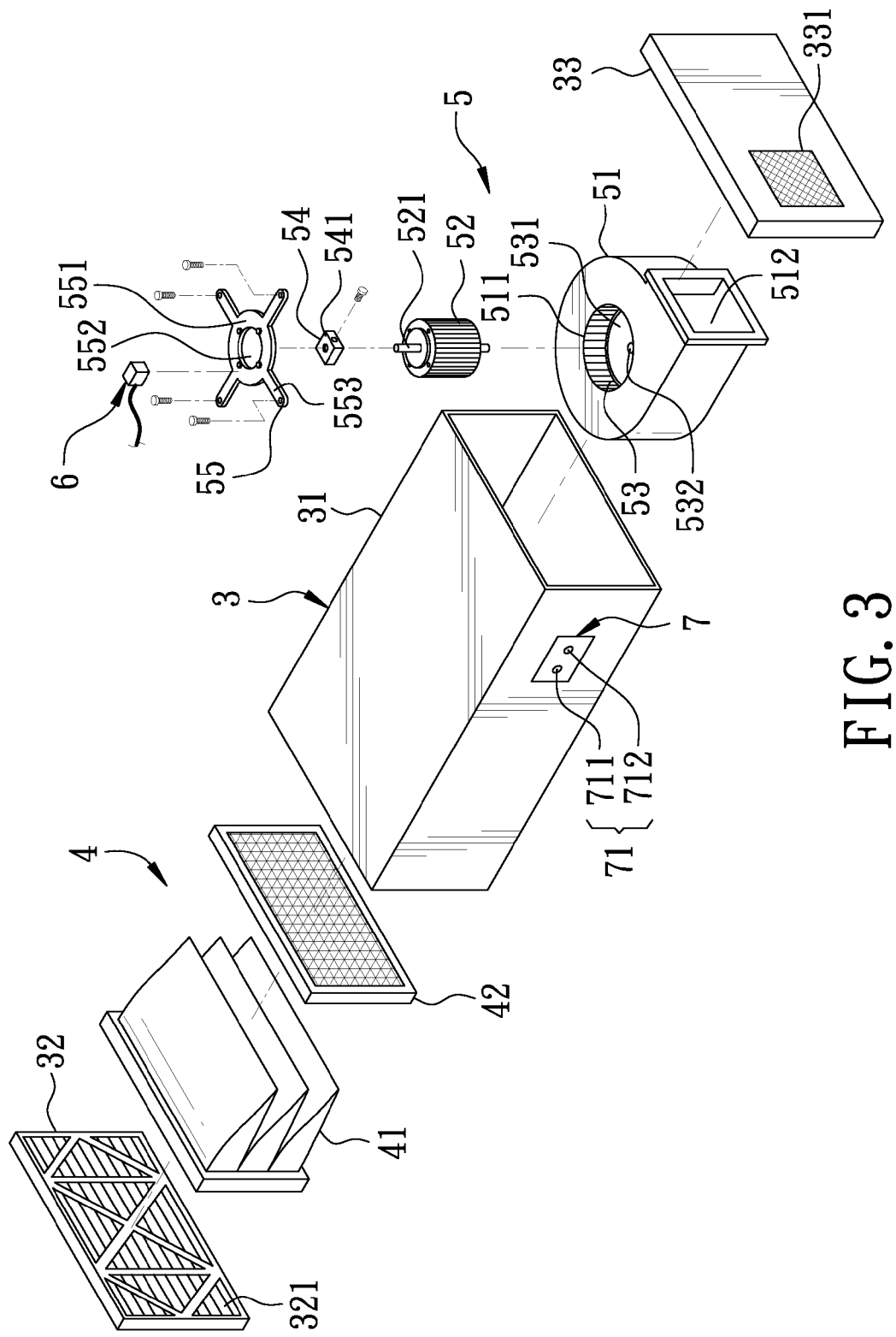
FIG. 3 is an exploded perspective view of an air filter with a clog-detecting device in the present invention.

A preferred embodiment of an air filter with a clog-detecting device in the present invention, as shown in FIG. 3, includes a housing 3, a filter unit 4, an exhauster 5, a magnetic induction unit 6 and a warning unit 7 as main components combined together.

The housing 3 is formed with a hollow casing 31 having one side of its opening assembled with a front cover 32 bored with a wind intake 321 and another side of its opening disposed with a rear cover 33 bored with a wind outlet 331.

The filter unit 4 is assembled in the casing 31 and positioned between the wind intake 321 and the wind outlet 331, consisting of at least one filter bag 41 and one filter plate 42. The filter bag 41 is assembled in the casing 31 and positioned adjacent to the front cover 32, while the filter plate 42 is positioned in the center of the casing 31.

The exhauster 5 to be installed between the wind outlet 331 of the rear cover 33 and the filter unit 4 is provided with a cover body 51 consisting of at least one air intake 511 and one exhaust hole 512. A motor 52 to be installed in the air intake 511 is disposed with a rotating spindle 521 inserted out of the opposite ends of the motor 52 and having its lower end axially fixed with a fan blade 53 received in the cover body 51. In this preferred embodiment, the fan blade 53 has its lower side combined with a disk 531 having its center connectedly mounted with a fixed base 532 and secured with the rotating spindle 521 of the motor 52. Further, the rotating spindle 521 of the motor 52 has its upper end axially fixed thereon with a metallic plate 54 formed with at least one projection 541 and fixed on the rotating shaft 521 by a bolt screwed through one lateral side of the metallic plate 54. In this preferred embodiment, the metallic plate 54 is a square plate having four corners respectively formed with a projection 541, and the exhaust hole 512 of the exhauster 5 communicates with the wind outlet 331 of the rear cover 33. The exhauster 5 further contains a support frame 55 that is composed of a ring 551 having its center bored with an opening 552 and extension members 553 extending diametrically out of the circumference of the ring 551 to be threadably secured on the cover body 51 by bolts. The motor 52 is firmly screwed at the wall of the opening 552 of the ring 551 by bolts, and the metallic plate 54 axially fixed on the rotating spindle 521 of the motor 52 is exactly positioned in the opening 552 of the ring 551.

The magnetic induction unit 6 is positioned by the side of the metallic plate 54. In this preferred embodiment, the magnetic induction unit 6 is an approach switch assembled on the outer surface of the ring 551 of the support 55 and located near the metallic plate 54 for inducting each other. When the projections 541 of the metallic plate 54 approach the magnetic induction unit 6 for a distance preset, the magnetic induction unit 6 will immediately produce a relative pulse signal, and when the pulse signal frequency produced by the magnetic induction unit 6 inducing the metallic plate 54 is higher than a frequency preset, it is indicated that the air filter is operated abnormally.

The warning unit 7 is assembled on the casing 31 and electrically connected with the magnetic induction unit 6. In this preferred embodiment, the warning unit 7 is composed of at least two indicating lamps 71 containing a normal signal lamp 711 and an abnormal signal lamp 712 to be controlled by the magnetic induction unit 6 to indicate whether the air filter is operated normally or abnormally. Further, the normal signal lamp 711 and the abnormal signal lamp 712 are respectively indicated by green light and red light.

Figure 4:
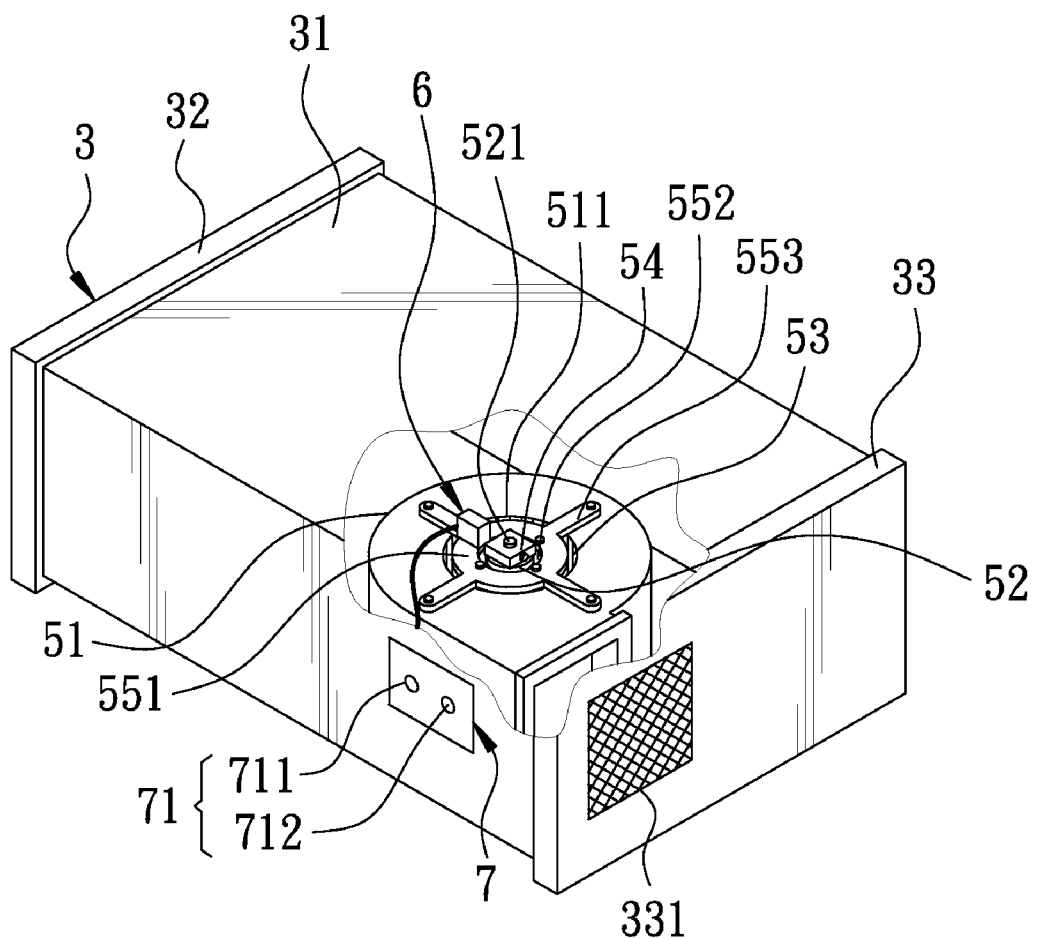
FIG. 4 is a partial cross-sectional view of the air filter with a clog-detecting device in the present invention.

Referring to FIG. 4, when the motor 52 of the exhauster 5 is operated, the fan blade 53 and the metallic plate 54 will be driven to rotate and simultaneously the magnetic induction unit 6 will induce the metallic plate 54. When any one of the projections 541 of the metallic plate 54 approaches the magnetic induction unit 6 for a distance preset, the magnetic induction unit 6 will produce a relative pulse signal, and when frequency of the pulse signal is lower than the frequency preset, the magnetic induction unit 6 will synchronously transmit a signal to the warning unit 7 to be indicated by the normal signal lamp 711. On the contrary, when the pulse signal frequency is higher than the preset frequency, the magnetic induction unit 6 will transmit a signal to the warning unit 7 to be indicated by the abnormal signal lamp 712.

Figure 5:
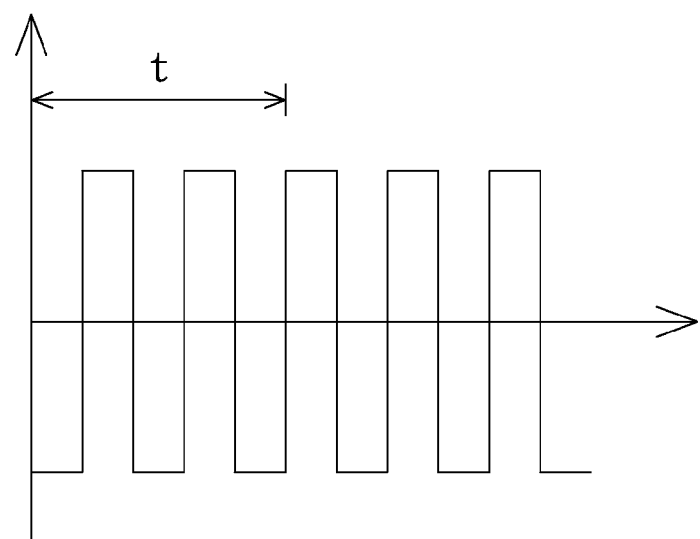
FIG. 5 is a diagram showing the pulse signal frequency produced by a magnetic induction unit inducing a metallic plate when the air filter is operated normally in the present invention.

FIG. 5 shows the pulse signal frequency produced by the magnetic induction unit inducing the metallic plate when the air filter is operated normally. When the air filter is under a normal operation condition, that is, the air filter is not clogged, the magnetic induction unit 6 will induce the metallic plate 54 and produce plural pulse signals whose frequency are lower than the frequency preset.

Figure 6:
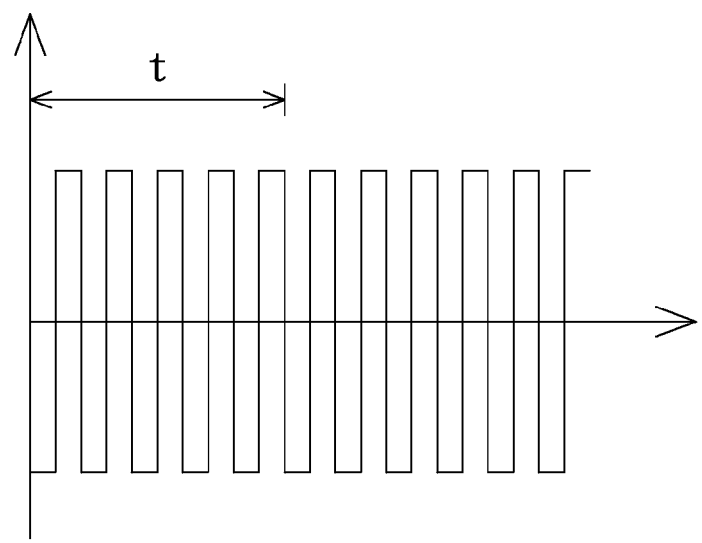
FIG. 6 is a diagram showing the pulse signal frequency produced by the magnetic induction unit inducing the metallic plate when the air filter is operated abnormally in the preset invention.

FIG. 6 shows the pulse signal frequency produced by the magnetic induction unit inducing the metallic plate when the air filter is operated abnormally. When the air filter is under an abnormal operation condition, that is, the air filter is clogged, the rotating velocity of the motor 52 will be greater than that of the motor 52 under a normal operation condition, and the metallic plate axially fixed on the rotating spindle of the motor 52 will be driven to rotate fast synchronously. Within a same period of time, the pulse signals produced by the magnetic induction unit 6 inducing the metallic plate 54 will increase in number, that is to say, the frequency of the pulse signals will become higher than the frequency preset.

While the preferred embodiment of the invention has been described above, it will be recognized and understood that various modifications may be made therein and the appended claims are intended to cover all such modifications that may fall within the spirit and scope on the invention.

I claim:

1. An air filter with a clog-detecting device comprising:
a housing formed with a wind intake and a wind outlet communicating with each other;
a filter unit assembled in the interior of said housing and positioned between said wind intake and said wind outlet of said housing;
an exhauster installed between said wind outlet of a rear cover of said housing and said filter unit;
said exhauster composed of a cover body bored with at least one air intake and an exhaust hole;
a motor positioned in said air intake and provided with a rotating spindle;
said rotating spindle having one end axially fixed with a fan blade received in said cover body and another end axially secured with a metallic plate;
said metallic plate having its peripheral edge formed with at least one projection;
said exhaust hole of said cover body communicating with said wind outlet of said rear cover of said housing;
said exhauster is provided with a support firmly screwed on said cover body for fixing said motor in position;
said support is composed of a ring and four elongate extension members extending diametrically out of its circumference;
said extension members threadably secured on said cover body;
said motor fixedly screwed on a wall of a center opening of said ring;
said metallic plate axially fixed with another end of said motor and exactly positioned in said center opening of said ring;
a magnetic induction unit disposed by one side of said metallic plate for inducing each other;
said magnetic induction unit producing a pulse signal when said projection of said metallic plate approaches said magnetic induction unit;
said magnetic induction unit is an approach switch; and
a warning unit assembled on said housing and electrically connected with said magnetic induction unit.

2. The air filter with a clog-detecting device as claimed in claim 1, wherein said warning unit is composed of at least two indicating lamps respectively for indicating an abnormal and a normal operating condition.

3. The air filter with a clog-detecting device as claimed in claim 2, wherein said two indicating lamps comprise a normal signal lamp and an abnormal signal lamp.

4. The air filter with a clog-detecting device as claimed in claim 1, wherein said metallic plate is a square plate having four corners respectively formed with a projection.

5. The air filter with a clog-detecting device as claimed in claim 1, wherein said magnetic induction unit is positioned at an outer surface of a ring.

6. The air filter with a clog-detecting device as claimed in claim 1, wherein said fan blade has its lower side disposed with a disk connected with said fan blade, said disk having its center secured with a fixing base connected with said rotating spindle of said motor.

\* \* \* \* \*